United States Patent [19]

Dolby et al.

[11] Patent Number: 4,815,068
[45] Date of Patent: Mar. 21, 1989

[54] AUDIO ENCODER FOR USE WITH MORE THAN ONE DECODER EACH HAVING DIFFERENT CHARACTERISTICS

[76] Inventors: Ray M. Dolby, 3340 Jackson St., San Francisco, Calif. 94118; Ioan R. Allen, 18 Hemway Ter., San Francisco, Calif. 94117; Randolph G. Pauker, 1015 Euclid Ave., #2, Berkeley, Calif. 94708

[21] Appl. No.: 82,651

[22] Filed: Aug. 7, 1987

[51] Int. Cl.⁴ .......................... G11B 5/09; G11B 5/02; H04N 5/94
[52] U.S. Cl. ..................... 369/175; 369/54; 358/336; 360/27
[58] Field of Search ....................... 369/48, 49, 54, 59; 358/336, 340; 360/27

[56] References Cited

U.S. PATENT DOCUMENTS

| | | | |
|---|---|---|---|
| 4,101,849 | 7/1978 | Blackmer | 333/14 |
| 4,136,314 | 1/1979 | Blackmer et al. | 328/167 |
| 4,433,347 | 2/1984 | Sugiyama | 358/342 |
| 4,490,691 | 12/1984 | Dolby | 333/14 |
| 4,641,204 | 2/1987 | Sugiyama | 358/341 |

FOREIGN PATENT DOCUMENTS 0206746 12/1986 European Pat. Off. .

OTHER PUBLICATIONS

"A Noise Reduction System for Consumer Applications" by Dolby, Audio Engr. Society, New York, Oct. 1970.
"Dolby B-Type Noise Reduction System" by Berkovitz et al., Audio, Sep.-Oct. 1973.
"A 20 db Audio Noise Reduction System for Consumer Applications" by Dolby, J. Audio Eng. Soc., vol. 31, No. 3, Mar. 1983, pp. 98-113.
"Optimum Use of Noise Reduction in FM Broadcasting" by Dolby, J. Audio Eng. Soc., vol. 21, No. 5, Jun. 1973, pp. 357-362.
"Dolby B-Type Noise Reduction for FM Broadcasts"; by D. P. Robinson, J. Audio Eng. Soc., vol. 21, No. 5, Jun. 1973, pp. 351-356.

Primary Examiner—William L. Sikes
Assistant Examiner—Akm E. Ullah
Attorney, Agent, or Firm—Thomas A. Gallagher

[57] ABSTRACT

A "hybrid" encoder has a characteristic action suitable for substantially full complementary playback in an audio signal transmission or recording system using decoders designed for one type complementary encode/decode system while permitting compatible decoding with decoders designed for use with another type complementary encode/decode system, or playback without any special decoders at all. The hybrid encoder is a series or parallel arrangement of two encoders that are modifications of standard encoders used in the two systems. In the preferred embodiments the two systems are A-type noise reduction and spectral recording. A variable degree of hybrid encoding is provided by varying the characteristic controlling circuit parameters in the two encoders, or in a preferred embodiment, by providing a variable combining arrangement that selects selects from the outputs of a hybrid encoder and an unmodified encoder (spectral recording).

27 Claims, 7 Drawing Sheets

AUDIO ENCODER FOR USE WITH MORE THAN ONE DECODER EACH HAVING DIFFERENT CHARACTERISTICS

BACKGROUND OF THE INVENTION

The present invention relates generally to audio noise reduction and signal processing systems. In particular, the invention relates to the problem of encoding audio signals in such a way that substantially full complementarity is obtained when using decoders designed for one type complementary encode/decode system while permitting compatible decoding with decoders designed for use with another type complementary encode/decode system, or without any special decoders at all, while minimizing audibly objectionable side-effects.

In its preferred embodiments, the invention is directed to the processing of audio signals recorded in motion picture sound tracks. However, the principles of the invention are not limited to the motion picture sound environment and also may be applied to other audio recording and reproduction environments.

Within the past ten years or so an increasing number of motion pictures have been made with sound tracks encoded with A-type noise reduction, a complementary system developed by Dolby Laboratories which requires a decoder to obtain its full benefits. The use of A-type noise reduction for motion picture sound tracks is described in "The Production of Wide-Range, Low-Distortion Optical Soundtracks Utilizing the Dolby Noise Reduction System," by Ioan Allen, *J. SMPTE*, September 1975, Vol. 84, No. 9, pp. 720–729. Over ten thousand motion picture theaters around the world are equipped with A-type noise reduction decoders. Currently, about forty percent of all motion pictures produced in the United States have A-type encoded sound tracks.

The basic elements of A-type noise reduction are described in "An Audio Noise Reduction System," by Ray M. Dolby, *J. Audio Eng. Soc.*, October 1967, Vol. 15, No. 4, pp. 383–388. Various A-type noise reduction products (encoders, decoders, encoder/decoders) are manufactured and sold by Dolby Laboratories. A-type noise reduction employs four frequency bands: band 1, 80 Hz lowpass; band 2, 80 Hz to 3 kHz bandpass; band 3, 3 kHz high-pass; and band 4, 9 kHz high-pass.

Recently, the originators of A-type noise reduction introduced and began marketing an improved audio signal processing system, spectral recording. This new system is described in "The Spectral Recording Process," by Ray Dolby, *J. Audio Eng. Soc.*, Vol. 35, No. 3, March 1987, pp. 99–118. Various spectral recording products (encoders, decoders, and encoder/decoders) are manufactured and sold by Dolby Laboratories. Spectral recording employs two frequency ranges with a broadly defined crossover frequency of 800 Hz, such that there is a substantial overlap.

Spectral recording bears some similarities to A-type noise reduction. For example, both are complementary systems in which a main signal path is primarily responsible for conveying high level signals and a side chain or side path signal with the system characteristic (A-type or spectral recording, respectively) is additively combined with the main signal in the encoding mode and subtractively in the decoding mode, whereby an overall complementary action is obtained.

In spectral recording, a multi-stage series arrangement is used with staggered regions of dynamic action. The high-level and mid-level stages have both high frequency and low frequency sub-stages with a crossover frequency of 800 Hz. The low-level stage has only a high frequency sub-stage, with an 800 Hz high pass characteristic. In the spectral recording encoded, each stage has a low-level gain of about 8 dB, such that when the outputs of the stages are combined with the main signal path a total dynamic effect of about 16 dB is obtained at low frequencies and 24 dB at high frequencies. The reciprocal characteristic is provided in the spectral recording decoder.

In the A-type system, a single stage is used in which the outputs of the four bands are combined with the main signal path in such a way as to produce a low-level output from the encoder which is uniformly 10 dB higher than the input signal up to about 5 kHz, above which the level increases smoothly to 15 dB higher at 15 kHz. The reciprocal characteristic is provided in the A-type decoder.

A further difference between A-type noise reduction and spectral recording is the manner in which dynamic action is provided. In the A-type system, the dynamic action in each of the four frequency bands is provided by a fixed band circuit in which the signal gain varies essentially uniformly across each particular band in response to signals within the frequency band. In other words, in an A-type expander, the dynamic action within each band is a variable, but flat, low level cut across the entire band.

In the spectral recording system, the dynamic action is provided by an action substitution technique that combines, in a synergistic manner, the characteristic actions of fixed band and sliding band (variable filter) circuits operating in each of the sub-stages. The action substitution technique and the use of single-pole filters to allow a broad overlapping of action above and below the 800 Hz crossover frequency, provides an overall dynamic action that is highly conformable to signals virtually anywhere in the frequency band. In other words, the spectral recording encoding action is highly frequency selective and adaptive by virtue of its action substitution of fixed band and sliding band elements operating in broadly overlapping frequency bands; the overall effect is essentially that of variable width and variably positioned frequency bands, an almost infinitely variable characteristic that adapts itself to both the level and frequency content of the signal. In contrast, the A-type system, which employs non-varying frequency bands, each having fixed band dynamic action, has a characteristic that adapts itself only in a limited way to signal level and frequency content.

Another difference in the characteristics of spectral recording and the A-type system is that spectral recording employs level dependent low- and high-frequency anti-saturation, providing in the encoded signal a gentle roll-off in the low and high frequency regions that increases as the signal level rises in order to reduce the possibility of overloading the medium on which a spectral recording encoded signal is recorded or transmitted at frequency extremes where the ear is less sensitive to noise. Also, spectral recording employs low- and high-frequency spectral skewing, an abrupt and deep reduction in the low-and high-frequency extremes of the encoded signal, primarily for the purpose of reducing the susceptibility of the spectral recording decoder to any uncertainties in the low- and high-frequency extreme regions of the recording or transmission medium.

Both anti-saturation and spectral skewing are complementary in the spectral recording system; complementary de-anti-saturation and spectral de-skewing are provided in the decoder.

In order to benefit from the improved performance and characteristics of spectral recording, such as its improved dynamic range, lower noise modulation, improved transient response, and greatly reduced low- and high-frequency saturation, it would be desirable to employ that new system rather than A-type noise reduction in the production and playback of motion picture sound tracks. Of particular benefit for use on motion picture optical (photographic) sound tracks is the substantially improved low- and high-frequency overload margin provided by spectral recording.

Adoption of spectral recording for motion picture sound tracks would present no problems if spectral recording encoded sound track motion picture films were supplied only to motion picture theaters having spectral recording decoders. However, two factors severely restrict that approach: (1) motion picture producers prefer, whenever possible, to release a film in "single inventory" (for example, all prints of a specific film are A-type encoded, even those prints supplied to theaters not having A-type decoding equipment), and (2) in view of the very large number of theaters having A-type decoders, single inventory films must be compatible with those A-type decoders.

In view of the various differences between the A-type and spectral recording systems, it would appear, upon first analysis, that the systems are not compatible, in the sense that reproduction of spectral recording encoded audio signals by A-type decoders would likely result in subjectively annoying audible effects. It would also appear that the reproduction of spectral recording encoded audio signals without any special decoding (non-decoded playback) would likely also result in subjectively annoying audible effects. However, in accordance with the teachings of the invention such apparent incompatibility can be overcome.

Listening tests indicate that audible effects relating to system compatibility problems may be characterized as: (1) apparently steady-state effects, namely, changes in frequency content of the reproduced signal as, for example, low frequency or high frequency emphasis, and (2) dynamic effects, usually referred to as "pumping," whereby signals and/or noise in one part of the frequency spectrum vary in level in accordance with the level of a signal in another part of the spectrum. The extent to which the ear tolerates such effects is, of course, level dependent: if the effect is at a sufficiently high level it is not acceptable.

Preferably, dynamic effects should be eliminated or minimized because such instability in the reproduced signal is more readily perceived by the listener than are steady-state effects. Steady-state effects are less likely to be noticed by most listeners because there is no changing sound to attract the ear's attention. Even to critical listeners steady-state effects may seem attributable to differences in the sound mix. Of course, a direct A/B comparison between fully complementary encoding/decoding and a partially complementary "compatible" arrangement would reveal some differences in the reproduced signal. However, in a practical situation, such a comparison is not available and the only audible cues are those in the reproduced signal itself. For example, it has been found that balanced steady-state low- and high-frequency response effects tend to be overlooked by the ear. Thus, to the extent that the spectral recording roll-off of the low- and high-frequency regions of the encoded signal is not restored by A-type or non-decoded playback, the balanced or symmetrical effect on the frequency spectrum makes the resulting playback acceptable to most listeners.

In cases where dynamic stability is not achieved and there are low level dynamic effects in the presence of primary signals, it has been found that the most subjectively uncomfortable audible effects are those resulting from signal deficiencies rather than excesses in the portion of the reproduced signal suffering such low level dynamic effects. Such signal deficiencies are often referred to as a "suck-out" effect. Under such conditions level variations or pumping that causes low level signals to drop further in level, as from an audible to an inaudible level, are particularly disturbing to the ear. Thus, a generalized statement of an underlying principle of the present invention is that if the encoder always provides at least as much or a surplus of signal at each frequency when the signal is decoded as in the original signal before encoding, the ear tends to be satisfied. This principle may be referred to as the principle of signal sufficiency. In other words, if there is any decode error, it should be positive so as to provide an excess of signal; the ear is more tolerant of an excess rather than a deficiency of signal.

The encoding characteristics of the spectral recording system provide an excellent starting point for generating an encoded signal that meets the requirements of the principle of signal sufficiency. This is because spectral recording provides highly frequency selective compression during encoding: the compressor tends to keep all signal components fully boosted at all times; when the boosting must be cut back at a particular frequency, reduction in boost essentially is not extended to low-level signal components at other frequencies. The audible effect of this type of compression is that the signal appears to be enhanced and brighter but without any apparent dynamic compression effects (the ear detects dynamic action primarily by the effect of a gain change due to a signal component at one frequency on a signal component at some other frequency, somewhat removed). As a consequence, spectral recording encoded signals reproduced with no special decoding whatsoever are free of pumping effects for nearly all signal conditions because of the compressor's frequency adaptiveness (dynamic action occurs substantially only at frequencies requiring such action and nowhere else) and thus are discernible to a critical listener as compressed signals only because there are changes in the low frequency and high frequency emphasis (a maximum of 16 dB compression at low frequencies and 24 dB at high frequencies).

In accordance with the underlying principle of this invention, it has been found that signal deficiencies in the order of a few decibels, say 2, 3, or 4 dB of low level signals, such as low level ambiences, in the presence of primary or dominant signals, are audibly acceptable to most listeners, but that larger deficiencies, in the order of 6 or 12 dB are not acceptable to most listeners. In contrast, it has been found that signal surpluses of 10, 12, 15 dB or even more of such low level signals in the presence of primary signals are generally acceptable to most listeners. Thus, in accordance with the principle of signal sufficiency, the playback arrangement may be considered to be compatible with an encoder if at any frequency or time the low level signals or ambiences in the presence of primary signals in the reproduced signal are no less than a few dB below the original signal and are no more than some 10 to 15 dB above the original signal. This question of compatibility relates to low level signals in the presence of primary or dominant signals because it is such low level signals that are primarily manipulated by the A-type and spectral recording systems. In those systems high level primary or dominant signals are substantially unaffected.

If a spectral recording encoded signal is played back using an A-type decoder the results conform generally to the above stated principle except for certain signal conditions that cause audible pumping and/or signal suck out in the 80 Hz to 3 kHz A-type band 2.

Consider, for example, the application to a spectral recording encoder of input signals including signals in the 80 Hz to 3 kHz range. For low level signals below its threshold, the spectral recording encoder (compressor) provides 16 dB of boost at low frequencies and 24 dB of boost at high frequencies. Boosting of low level signals narrows the dynamic range, resulting in signal compression. The amount of signal compression is reduced in accordance with the spectral recording encoder's compression law in a relatively narrow frequency range at ad near the frequency of signals exceeding the encoder threshold. The highly frequency selective or adaptive nature of the spectral recording encoder assures that the encoder's dynamic action is restricted to a relatively narrow frequency range in which dynamic action is required due to the presence of signals above threshold in that frequency range.

With respect to A-type playback, for low level signals below its threshold, the A-type decoder (expander) in band 2 provides about 10 dB of signal reduction uniformly across the 80 Hz to 3 kHz band. Reducing the level of low level signals widens the dynamic range, resulting in signal expansion. The amount of signal expansion throughout band 2 is reduced in accordance with the A-type decoder's expansion law in response to the presence of signals above threshold anywhere within band 2. Since band 2 is relatively wide, it is likely that signals above threshold located in one part of band 2 that control the dynamic expansion action will cause audible pumping of other low level signals and noise contained with the original signal in the frequency range of band 2 prior to encoding, as the gain throughout band 2 varies uniformly across the band. Such pumping, in the direction of signal suck out, is likely to be audible for certain signal conditions because band 2 is so wide in frequency that the signal controlling the dynamic action cannot effectively mask the modulation of other signals and noise in band 2 as the gain of the entire band varies.

As mentioned above, many A-type sound track encoded motion pictures have been released in single inventory, despite the fact that not all theaters have A-type decoding equipment. Such non-equipped theaters typically employ sound systems designed to play films conforming to the so-called "Academy" monophonic (mono) format, developed in the 1930's. As is well known, a considerable amount of treble cut is applied when optical sound tracks are played back in such theaters. This high frequency roll-off, referred to as the Academy characteristic, produces an attenuation of at least 20 dB at 9 kHz. Subjectively, the roll-off provided by the Academy characteristic brings the tonal character of a A-type encoded track essentially back to normal. The low level boosting of high frequency components in the encoding process adequately compensates for the high frequency Academy roll-off. Low frequency, low level signals will be left in the boosted condition, but this effect is noticeable only when a track is switched directly from A-type decoding to Academy replay. Consequently, A-type encoded films sound acceptable to most listeners when played in "Academy mono" theaters and film-makers often make the judgment that a single inventory release is appropriate.

Spectral recording encoded films, although having a greater amount of compression than A-type encoded films, also sound acceptable to most listeners when played in "Academy mono" theaters. In fact, the greater compression may be beneficial in the environment of most "Academy mono" theaters in that such theaters tend to have high ambient noise levels from noisy air conditioning systems and/or are part of a multi-screen theater complex in which sound from adjacent auditoria is audible. In addition, the highly frequency selective encoding in the spectral recording compressor results in less likelihood of audible pumping than with an A-type encoded sound track.

SUMMARY OF THE INVENTION

In accordance with the teachings of the present invention, encoding arrangements are disclosed that substantially retain the improved characteristics of the spectral recording process when spectral recording decoders are used, while achieving reproduction audibly acceptable to most listeners when A-type decoders are used. Simply stated, the invention provides, at least for certain input signal conditions, for the addition of some degree of the A-type encoding characteristic to a modified spectral recording characteristic so that when the signal is reproduced by an A-type decoder the principle of signal sufficiency is not violated. The problem overcome relates mainly to the deficiencies occurring in the reproduced signal due to the action of band 2 of the A-type decoder, as described above. By adding a sufficient amount of A-type encoding, pumping and suck out effects in band 2 are restricted to an extent essentially unnoticeable to the ear.

In addition, the encoding arrangements of the present invention continue to permit reproduction audibly acceptable to most listeners for sound tracks played back by Academy mono systems. Since A-type encoding per se and spectral recording encoding per se provide generally acceptable playback by Academy mono systems, a degree of A-type encoding along with modified spectral recording encoding also provides the same sort of acceptable results.

As with current practices, the decision regarding the release of a particular film in a single inventory format, employing an encoding arrangement according to the invention, would be based on the artistic and business judgment of the film-maker.

According to one aspect of the present invention, a modified A-type encoder and a modified spectral recording encoder are placed in series to provide the encoded audio signal for application to an audio transmission or recording channel, such as a motion picture sound track. The encoders are modified principally with respect to their dynamic action, such that each provides roughly two-thirds of the maximum compression provided in their standard, unmodified form. Alternatively, a modified A-type encoder and a modified spectral recording encoder are placed in parallel to provide an encoded audio signal. According to this parallel alternative, the encoders are also modified principally with respect to their dynamic action and, in addition, the A-type encoder may also be modified so as to operate only with a single band, band 2. For convenience, these arrangements in general will be referred to as "hybrid" encoding.

In practice, continuous encoding with the full hybrid encoding characteristic may not be necessary under all signal conditions and it may be acceptable to encode using a normal unmodified spectral recording encoder under some or most signal conditions while employing hybrid encoding, or some degree of hybrid encoding, only during signal conditions that cause undesirable audible effects in the playback system. Accordingly, in accordance with another aspect of the invention, the encoder may be variable.

In principle, a variable encoder may be achieved by providing means to control the characteristic action determining circuit parameters of the modified A-type and spectral recording encoders in the hybrid encoder. However, a more practical way of providing variable encoding is by way of an arrangement having two paths, each receiving the signal to be encoded. The first path includes the series connected modified A-type encoder and modified spectral recording encoder, or, alternatively, the parallel connected arrangement. The second path includes a standard, unmodified spectral recording encoder. Compensation for any phase differences in the two paths may be provided. A variable combining means receives the outputs of the two paths and selects the output of one path or the other or some additive combination of the two paths. In practice, with a variable encoder, the standard, unmodified spectral recording encoder path preferably would be the normal mode of operation except during difficult passages that cause audible side-effects when the encoded signal is played back using an A-type decoder. During such passages, some amount of the hybrid encoding path is selected. The extent to which one path or another is selected, or even whether the normal mode of operation excludes any contribution from the hybrid path, is an artistic choice to be made by the producers of the recording. The degree of compatibility with A-type decoders may, after some period of years, become less important as substantial numbers of theaters install spectral recording decoders, leaving equipped with A-type decoders only those theaters with less of a critical interest in sound quality.

It should be understood that the encoding arrangements according to the present invention are for use in making an encoded signal to be decoded by an end user, as for example a motion picture sound track to be played when a film is exhibited in a motion picture theater. Thus, the encoding arrangements according to the present invention are intended for a single record/playback generation. They are not intended to be used, for example, in connection with the production of professional sound recordings in which multi-generation recordings require that the decoded signal is as close to the original signal input as possible.

In the production of motion picture sound tracks according the teachings of this invention, it is likely, for convenience, that not only the actual motion picture film sound track itself but also the so-called "dubbing master" will be recorded with a type of hybrid encoding. A dubbing master is the master sound track recording, usually recorded on magnetic tape, from which the optical sound track is made. When the dubbing master is hybrid encoded, a hybrid decoder will be demanded by users in order to verify the originally recorded sound. Accordingly, the invention also provides for hybrid decoding apparatus suitable for accurately decoding a signal that has been hybrid encoded according to any of the teachings of the present invention.

Thus, stated more generally, in accordance with one aspect of the invention, a "hybrid" encoder has a characteristic action suitable for substantially full complementary playback in an audio signal transmission or recording system using decoders designed for one type complementary encode/decode system while permitting compatible decoding with decoders designed for use with another type complementary encode/decode system, or playback without any special decoders at all. The hybrid encoder comprises first encoder means having a first encoding characteristic action, which characteristic action is a modification of the encoding characteristic of the one type complementary encode/decode system, second encoder means having a second encoding characteristic action, which characteristic action is a modification of the encoding characteristic of the other type complementary encode/decode system, means for coupling the first and second encoder means to provide hybrid encoder means having a hybrid encoding characteristic action combining aspects of the two encoding characteristic actions, and means for applying audio signals processed by the hybrid encoder means to a signal transmission or recording medium which feeds a playback arrangement that includes a decoder of the one type or the other type complementary encode/decode system or no complementary encode/decode system decoder. The first and second encoder means may be coupled in series or in parallel. Also, the characteristic actions of the first and second encoder means may be varied to provide a variable encoder. In preferred embodiments the first encoding characteristic action of the first encoder means is a modification of an A-type characteristic action and the second encoding characteristic action of the second encoder means is a modification of a spectral recording characteristic action. The first aspect of the invention may also be embodied in an encoding/decoding system.

According to a second aspect of the invention, a variable encoder has a characteristic action suitable for substantially full complementary playback in an audio signal transmission or recording system using decoders designed for one type complementary encode/decode system while permitting compatible decoding with decoders designed for use with another type complementary encode/decode system, or playback without any special decoders at all. The variable encoder comprises first circuit means including first encoder means having a first encoding characteristic action, which characteristic action is a modification of the encoding characteristic of the one type complementary encode/decode system, second encoder means having a second encoding characteristic action, which characteristic action is a modification of the encoding characteristic of the other type complementary encode/decode system, means for coupling the first and second audio processing encoder means to provide hybrid encoder means having a hybrid encoding characteristic action combining aspects of the two encoding characteristic actions. The variable encoder further comprises second circuit means including third encoder means having an encoding characteristic action of the one type complementary encode/decode system, and means for variably selecting audio signals processed by the first circuit means and the second circuit means and applying the audio signals to a signal transmission or recording medium which feeds a playback arrangement that includes a decoder of the one type or the other type complementary encode/decode system or no complementary encode/decode system decoder. The first and second encoder means may be coupled in series or in parallel. In preferred embodiments the first encoding characteristic action of the first encoder means is a modification of an A-type characteristic action, the second encoding characteristic action of the second encoder means is a modification of a spectral recording characteristic action, and the third encoding characteristic action is a spectral recording characteristic action. The second aspect of the invention may also be embodied in an encoding/decoding system.

DETAILED DESCRIPTION OF THE INVENTION

Figure 1:
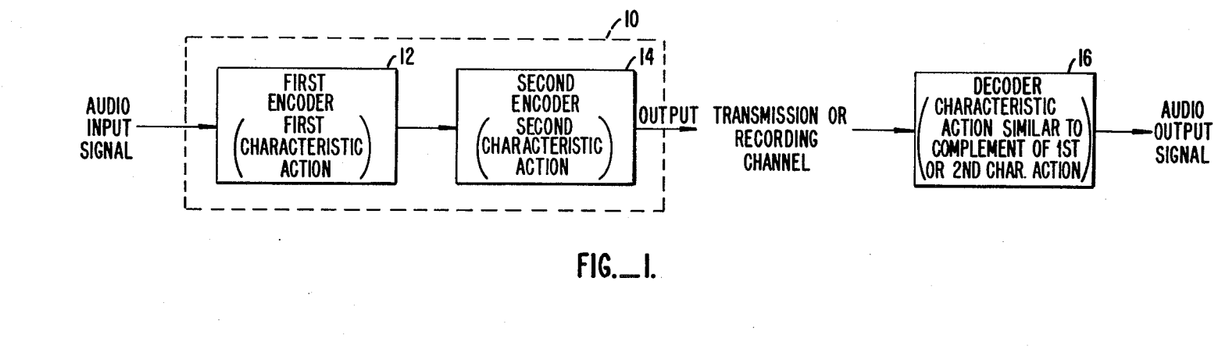
FIG. 1 is a functional block diagram of the apparatus according to one aspect of the present invention, employing a series hybrid encoder.

Referring now to the drawings, FIG. 1 is a functional block diagram of an encoding/decoding audio system according to one aspect of the invention, embodying a hybrid encoder according to this aspect of the invention. The audio input signal is coupled to a hybrid encoder 10 and the hybrid encoder output is coupled to a transmission or recording channel. Hybrid encoder 10 includes a first encoder 12 having a first characteristic action and a second encoder 14 having a second characteristic action. Encoders 12 and 14 are coupled such that the audio input signal is coupled first to the input of the first encoder 12, which in turn has its output coupled to the input of the second encoder 14. The output of the hybrid encoder 10, from the second encoder 14, is coupled to the transmission or recording channel. The hybrid encoding characteristic action is a hybrid or composite of the first and second characteristic actions, combining aspects of the two characteristic actions. The encoded audio signal from the transmission or recording channel is coupled to a decoder 16 that has a characteristic action similar to the complement of the first or second characteristic action of the encoders 12 and 14. The audio output signal is derived from decoder 16. Alternatively, the reproduction arrangement may include no decoder.

Encoders used in the present invention provide dynamic range compression and may, alternatively, be referred to as compressors: the dynamic range of signals applied to each encoder is reduced by the encoder. Decoders used in the present invention provide dynamic range expansion and may, alternatively, be referred to as expanders: the dynamic range of signals applied to each decoder is increased by the decoder. The overall encoding/decoding system may, alternatively, be referred to as a companding system.

In practice, the decoder 16 is the standard, unmodified decoder of one of two possible companding systems and the first and second encoders (12, 14) are modifications of the standard encoders used in the two companding systems. Modifications are made to the encoders 12 and 14 so as to achieve compatibility, in the sense discussed above in connection with the principle of signal sufficiency, when the hybrid encoded signal is reproduced by either of the two possible unmodified decoders or by a reproduction system using no decoder.

Figure 2:
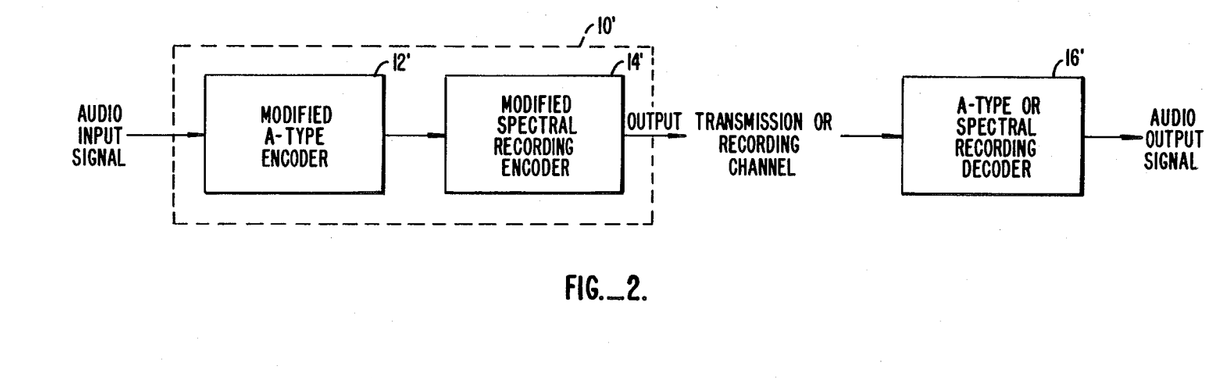
FIG. 2 is a functional block diagram of a preferred embodiment of the aspect of the invention shown in FIG. 1.

FIG. 2 is another functional block diagram showing a preferred embodiment of the aspect of the invention shown in FIG. 1. Elements in FIG. 2 related to those in FIG. 1 are labeled with prime marks for convenience and clarity. Throughout this document prime marks are used to denote related elements in the various Figures. The decoder 16' preferably has either a standard, unmodified A-type or a standard, unmodified spectral recording decoding (expander) characteristic action, and the encoders 12' and 14' have modified A-type and modified spectral recording encoding (compressor) characteristic actions. Alternatively, the reproduction arrangement may be an Academy monophonic system that includes no decoder. Listening tests indicate that it is preferable that the first encoder 12' has the modified A-type characteristic action; however, the reverse arrangement may also provide satisfactory results for some listeners. Accordingly, the invention is not limited to employing the modified A-type characteristic action in the first encoder 12' rather than the second encoder 14'.

The A-type and spectral recording characteristic actions employed in encoders 12' and 14' are "modified" principally in the sense that the maximum compression of each device is reduced to about two-thirds of the maximum compression provided by an unmodified A-type or spectral recording encoder. This extent of modification has been found to satisfy the requirements of the principle of signal sufficiency, explained above. The fundamental mode of operation and characteristic actions of the "modified" encoders are otherwise unchanged from standard A-type and spectral recording encoders. Alternatively, the modified A-type encoder 12' may be modified so as to function only as a band 2 encoder, inasmuch as the most significant compatability problems relate to the A-type band 2, as discussed above.

In a standard A-type encoder, the maximum level boost, for low level input signals below the encoder threshold, is about 10 dB at low frequencies, rising to 15 dB at high frequencies. As modified for use as encoder 12', or encoder 14' if placed second in the series arrangement, the maximum level boost of the A-type encoder is reduced from 10 dB to 6 dB at low frequencies and from 15 dB to 10 db at high frequencies. As mentioned above, in the A-type system, a single stage is used in which the summed outputs of four frequency bands, constituting the side path signal, are combined with the main path signal. The maximum level boost of the A-type encoder is reduced by reducing the relative signal contribution of the side chain with respect to the main path. This is easily accomplished, for example, by changing, at the input of the side chain/main path summing amplifier, the value of the summing resistor in either the side chain signal path or the main signal path.

In a standard spectral recording encoder, the maximum level boost, for low level input signals below the encoder threshold, is about 16 dB at low frequencies, rising to 24 dB at high frequencies. As modified for use as either encoder 12' or encoder 14', the maximum level boost of the spectral recording encoder is reduced from 16 dB to 10 dB at low frequencies and from 24 dB to 16 db at high frequencies.

As set forth in greater detail in the above cited paper ("The Spectral Recording Process"), spectral recording encoders comprise two stages, with staggered thresholds, in series at low frequencies and three stages, with staggered thresholds, in series at high frequencies. In their standard form, each spectral recording encoder stage provides a maximum boost of 8 dB, thus providing 16 dB of boost at low frequencies and 24 dB of boost at high frequencies. It has been found that for the best results in the hybrid encoder of the present invention that the gain is preferably reduced by different amounts in each of the stages: 8 dB to 6 dB in the high level stage (the stage with the highest threshold level), 8 dB to 6 dB in the mid-level stage, and 8 dB to 4 dB in the low level stage.

As in the A-type system, the spectral recording system also uses the arrangement in which a side path signal is combined with a main path signal. Consequently, the maximum level boost of the spectral recording encoder may also be changed by altering the side path/main path signal contributions. Because the spectral recording circuit employs multiple stages, the relative signal contribution of the side chain with respect to the main path must be changed in each stage. This too is easily accomplished, for example, by changing, at the input of the side chain/main path summing amplifiers of the three stages, the value of the summing resistor in either the said chain signal path or the main signal path.

The above modifications in low level signal boost provide insufficient low level signal expansion under certain signal conditions when hybrid encoded signals are reproduced using an A-type decoder, thus providing a surplus of low level signal. However, this surplus is, at most, about 6 dB; well within the limits suggested by the principle of signal sufficiency. When hybrid encoded signals are reproduced using a spectral recording decoder, there is too much low level signal expansion under certain signal conditions, thus causing an insufficiency of low level signal. However, this insufficiency is, at most about 2 dB and only in a portion of the frequency spectrum. This is also within the limits suggested by the principle of signal sufficiency.

Although these modifications in low level gain have been found to satisfy generally the principle of signal sufficiency and to provide acceptable compatibility when the hybrid encoded signal is played back using either a standard spectral recording decoder or a standard A-type decoder, other modifications of the encoders 12' and 14' are possible within the teachings of the present invention.

In practice, continuous encoding with the full hybrid encoding characteristic provided by the encoder 10 and 10' of FIGS. 1 and 2, respectively, may not be necessary under all signal conditions and it may be acceptable to encode using a normal unmodified encoder under some or most signal conditions while employing hybrid encoding, or some degree of hybrid encoding, only during signal conditions that cause undesirable audible effects in the playback system. Accordingly, the encoder may be variable.

In principle, a variable encoder may be achieved by providing means to control the characteristic action determining circuit parameters of the two encoders (12 and 14 or 12' and 14') in the hybrid encoder. For example, with respect to the embodiment of FIG. 2, a variable encoder may be provided by using variable resistance elements for the various summing resistors mentioned above. Suitable variable resistance elements are FET's operated along their linear characteristic, as is well known, and controlled in tandem, such as by a ganged potentiometer (pot). At one extreme position of the pot, the first encoder 12 or the modified A-type encoder 12' would function simply as a unitary gain buffer amplifier (the side path contribution of the A-type encoder would be reduced to zero, leaving only the main path which does not affect the input signal) and the second encoder 14 or the modified spectral recording encoder 14' would each function as normal unmodified encoders. At the other extreme of the pot, the first and second encoders (12 and 14, 12' and 14') would function as described in the embodiments of FIGS. 1 and 2, respectively.

Figure 3:
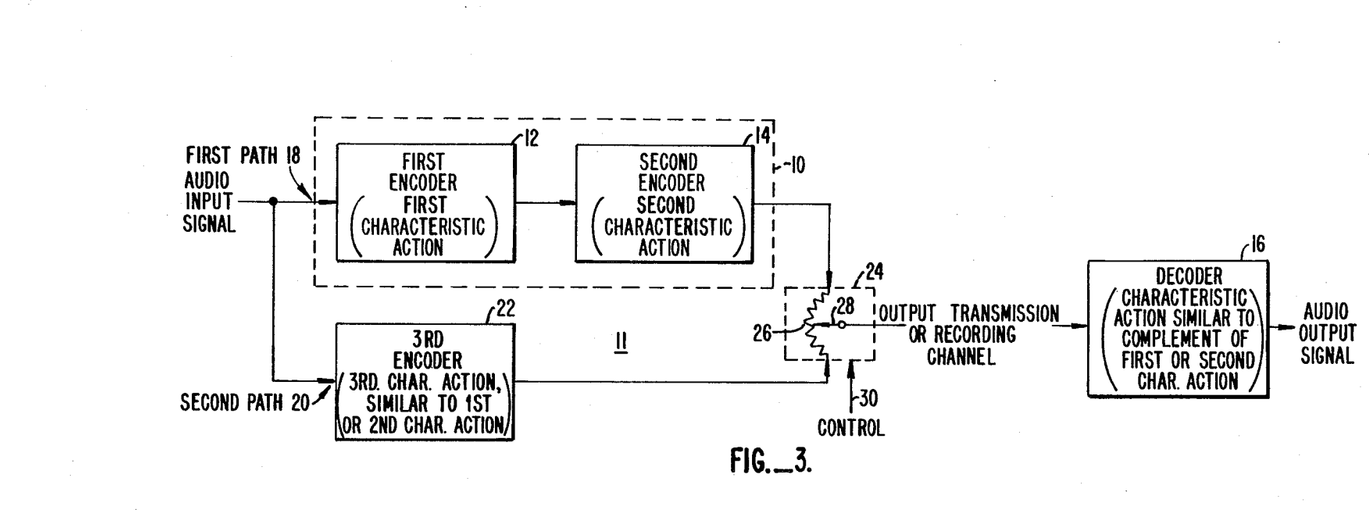
FIG. 3 is a functional block diagram of the apparatus according to another aspect of the present invention, employing a variable encoder that includes a series hybrid encoder.
Figure 4:
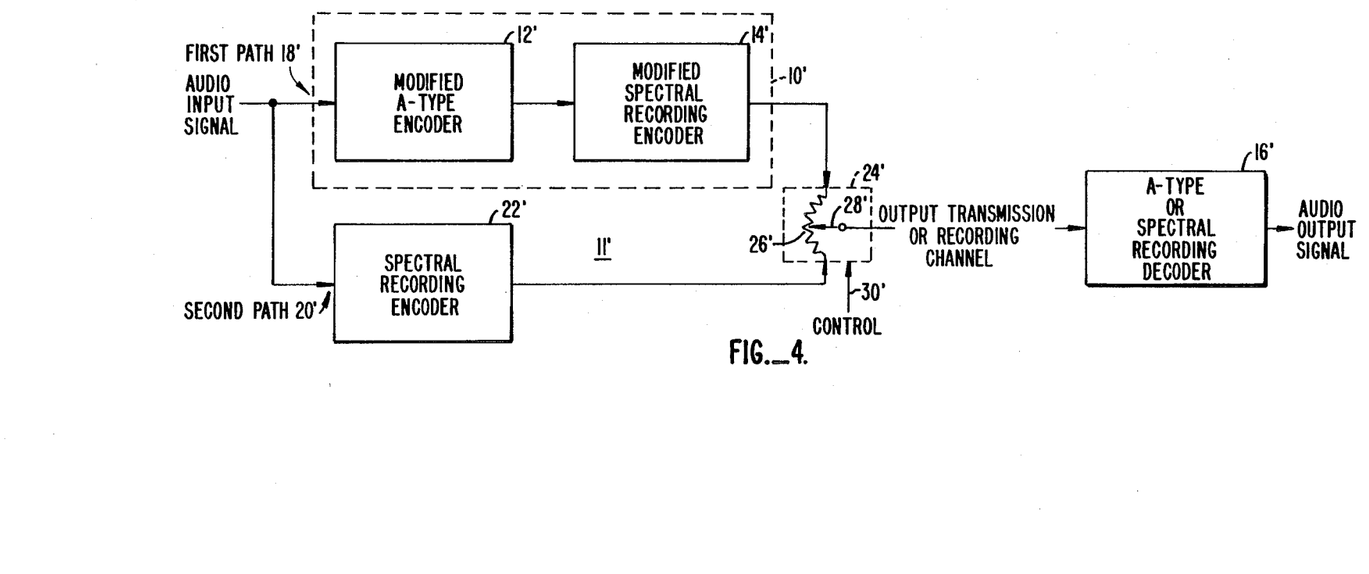
FIG. 4 is a functional block diagram of a preferred embodiment of the aspect of the invention shown in FIG. 3.

A more practical way of providing variable encoding is the arrangement according to the embodiments of FIGS. 3 and 4. FIG. 3 is a functional block diagram of an encoding/decoding system according to this further aspect of the invention, embodying a variable encoder according to this aspect of the invention. Elements in FIG. 3 that correspond to those in FIG. 1 bear the same reference numerals. This convention is used throughout this document: identical elements employ the same reference numerals. The variable encoder 11 has a first path 18 with a first circuit therein receiving the audio input signal. The first circuit includes the hybrid encoder 10, having the first encoder 12 and the second encoder 14, as described in connection with FIG. 1. A second path 20 with a second circuit therein also receives the audio input signal and includes a third encoder that has a third characteristic action similar to either the first or second characteristic action of the encoders 12 and 14.

Continuing the description of FIG. 3, a variable combining means 24 has one input coupled to receive the output of the first circuit from hybrid encoder 10 and has a second input coupled to receive the output of the second circuit from third encoder 22. The outputs of the circuits in the two paths are combined in variable proportions by the variable combining means 24. Variable combining means 24 is illustrated as a resistor 26 with its ends connected to the two inputs and an adjustable wiper 28 connected to the output of variable combining means 24. The position of wiper 28 is adjusted in response to the control signal on line 30. The resistor and wiper are shown in mechanical terms for clarity, although it will be appreciated that a purely electronic arrangement can be employed.

The output of the variable combining means 24 is coupled to the transmission or recording channel. The variable encoding characteristic action is variable under the control of the control signal 30 and may vary, at one extreme, from solely the hybrid characteristic action (when the wiper 28 is at its extreme position directly to the input derived from the circuit in the first path) to, at the other extreme, solely a characteristic action similar to one of the two characteristic actions used in forming the hybrid (when the wiper 28 is at its other extreme position, directly to the input derived from the circuit in the second path) or some combination of the two extremes (when the wiper 28 is at some intermediate position). The control signal 30 may be derived in various ways, including a manual, operator actuated source or a source totally or partially independent of operator intervention. The encoded audio signal from the transmission or recording channel is coupled to a decoder 16 that has a characteristic action that is similar to the complement of the first or second characteristic action of the encoders 12 and 14. The audio output signal is derived from decoder 16. Alternatively, the reproduction arrangement may include no decoder.

In practice, the decoder 16 is the standard, unmodified decoder of one of two possible companding systems, the first and second encoders (12, 14) are modifications of the standard encoders used in the two companding systems, and the third encoder 22 is a standard encoder used in one of the two companding systems. Modifications are made to the encoders 12 and 14 as in the embodiment of FIG. 1. However, the embodiment of FIG. 3 differs from the embodiment of FIG. 1 in that it recognizes that one of the standard, unmodified encoder characteristics is preferred whenever possible and that compatibility problems tend to arise only during certain passages or portions of the audio input signal. Accordingly, the third encoder characteristic may be taken to provide the encoding characteristic most of the time and the standard, unmodified characteristic of that third encoder may be diluted only some of the time by the characteristic of hybrid encoder 10. In the extreme case, the hybrid encoder characteristic may be chosen to the exclusion of the third encoder characteristic. The embodiment of FIG. 3 thus provides a flexible arrangement in which, at the extremes, either the hybrid encoder or one of the unmodified encoders provides the overall encoder output, or some combination of those extremes. The choice is preferably made in accordance with the principle of signal sufficiency, discussed above.

FIG. 4 shows a preferred embodiment of the aspect of the invention shown in FIG. 3. The decoder 16' preferably has either a standard, unmodified A-type or a standard, unmodified spectral recording decoding (expander) characteristic action. In the variable encoder 11', the encoders 12' and 14' have modified A-type and modified spectral recording encoding (compressor) characteristic actions, and the encoder 22' has a standard, unmodified spectral recording encoding (compressor) characteristic action. Alternatively, the reproduction arrangement may be an Academy monophonic system that includes no decoder. As discussed above in connection with FIG. 2, it is believed to be preferable that the first encoder 12' has the modified A-type characteristic action; however, the reverse arrangement may also provide satisfactory results. Accordingly, the invention is not limited to employing the modified A-type characteristic action in the first encoder 12' rather than the second encoder 14'. Encoders 12' and 14' are modified as explained above in connection with the embodiment of FIG. 3. Means for compensating for phase differences between the parallel paths in the embodiments of FIGS. 3 and 4 may be provided as necessary.

In the embodiment of FIG. 4, the preferred manner of operation is that the variable combining means default condition is such that it selects only or primarily the output of the third encoder 22', the standard, unmodified spectral recording encoder. Thus, unless the variable combining means 24' is caused by the control signal 30' to select a greater proportion of the hybrid encoder output from the first path, the output from the variable combining means applied to the transmission or recording channel is entirely or primarily a standard spectral recording encoded signal. In that way, the encoded signal applied to the transmission channel or recording channel is preferably a pure spectral recording encoded signal most of the time so as to obtain the full benefits of the new spectral recording system when the encoded signals are reproduced using a spectral recording decoder.

In practice, the encoded signal should be carefully monitored by an unmodified spectral recording decoder, an unmodified A-type decoder, and, if desired, by an Academy monophonic reproducing arrangement. In response to conditions as perceived by a human operator, by machine, or by some combination of human operator and machine, the control signal may be changed so as to cause the variable combining means to select some proportion (all, at the extreme) of the hybrid encoder output in order to improve, in the judgment of the record producer or film-maker, the compatible reproduction of the encoded signal when decoded by a standard, unmodified A-type decoder (and also, perhaps, when played by the Academy mono arrangement), while taking into account the reproduction of the encoded signal by the unmodified spectral recording decoder. As discussed above, the principal problem in the motion picture film sound environment is with respect to signals in band 2 of the A-type decoder. Thus, reproduced signals in that frequency range should be closely monitored.

If the control signal 30 is under the control of a human operator, the person in charge of the recording may make the artistic and technical judgment that for a particular segment of audio input signal, the audio output signal as decoded by the A-type decoder (or, in an unusual case, as played by the Academy mono arrangement), is unsatisfactory. Accordingly, the control signal is changed such that the variable combining means selects a sufficient proportion of the hybrid encoder output that the person in charge is satisfied that any audible problems in the reproduced signal from the A-type decoder are eliminated or reduced to an acceptable level while assuring that the reproduction of the segment through the spectral recording decoder is virtually indistinguishable from a signal reproduced from a pure spectral recording encoded signal. The variable combining means then returns to its default condition after the segment. It may be possible to automate or partially automate the practice by monitoring certain parameters in the decoded signal and by controlling the control signal 30 in response to such parameters, with or without operator intervention.

It will be apparent that the apparatus is capable of operating in ways other than the preferred way set forth herein. For example, the default condition of the variable combining means 24 could be selected to be other than the full, or nearly full spectral recording condition. Another possibility is that no default condition is provided and that an optimum condition for the variable combining means 24 is continuously sought as the audio input signal changes. Also, as discussed above, although a variable encoder according to this invention is preferably in accordance with the embodiments of FIGS. 3 and 4, variable encoding may also be provided by varying the characteristic controlling circuit parameters of the embodiments of FIGS. 1 and 2.

Figure 5:
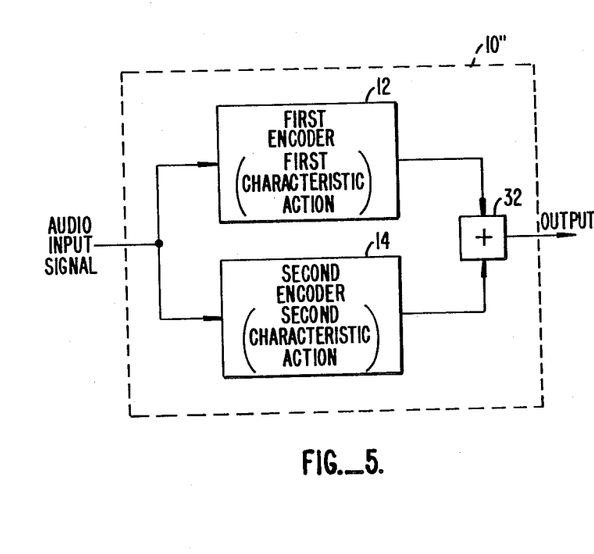
FIG. 5 is a functional block diagram of the apparatus according to a further aspect of the present invention, in which the encoders in the hybrid encoder are arranged in parallel.
Figure 6:
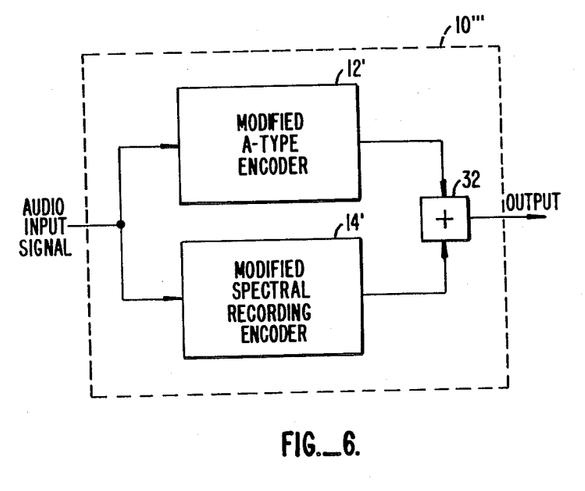
FIG. 6 is a functional block diagram of a preferred embodiment of the parallel hybrid encoder of FIG. 5.

The hybrid encoder 10, shown and described in connection with the embodiments of FIGS. 1 and 3, and the hybrid encoder 10', shown and described in connection with the embodiments of FIGS. 2 and 4, may be modified so as to arrange the series connected encoders of those embodiments in a parallel arrangement. FIG. 5 is a functional block diagram of a hybrid encoder 10" in which the first encoder 12 and second encoder 14 are arranged in parallel. The audio input signal is applied to both encoders 12 and 14 and their outputs are additively combined in a summing means 32 to provide the output. The parallel hybrid encoder 10" may be substituted for the series hybrid encoder 10 in FIGS. 1 and 3. FIG. 6 is a functional block diagram of a hybrid encoder 10''' in which the modified A-type encoder 12' and modified spectral recording encoder 14' are arranged in parallel. The audio input signal is applied to both encoders 12' and 14' and their outputs are additively combined in a summing means 32 to provide the output. The parallel hybrid encoder 10''' may be substituted for the series hybrid encoder 10' in FIGS. 2 and 4. Means for compensating for phase differences between the parallel encoders of FIGS. 5 and 6 may be provided as necessary. The parallel hybrid encoders 10" and 10''' may also be variable as discussed above in connection with the series embodiments of FIGS. 1 and 2.

As in the series arrangements of the embodiments of FIGS. 1 through 4, the hybrid encoding characteristic actions of the parallel arrangements of FIGS. 5 and 6 are a hybrid or composite of the characteristic actions of the two encoders, combining aspects of their two characteristic actions. Because of the different way in which the two characteristic actions combine when the encoders are in parallel, the maximum level boosts of the parallel encoders desirably may be different (usually greater) than the boost of the encoders when arranged in series. In a further modification to the parallel arrangement of FIG. 6, the modified A-type encoder 12' may be modified so as to function only as a band 2 encoder, inasmuch as the most significant compatibility problems relate to the A-type band 2, as discussed above. Moreover, a special band 2 may be incorporated into the modified spectral recording encoder, whereby its input is fed from the input to the spectral recording compressor stages and its output is combined with the outputs of the spectral recording compressor stages.

As mentioned above, there may be circumstances, such as in the production of a motion picture sound track dubbing master, under which it is desired to provide complementary decoding of the hybrid encoded signal. The embodiments described hereinafter provide for full complementary decoding of encoded signals produced according to the embodiments described above.

Figure 7:
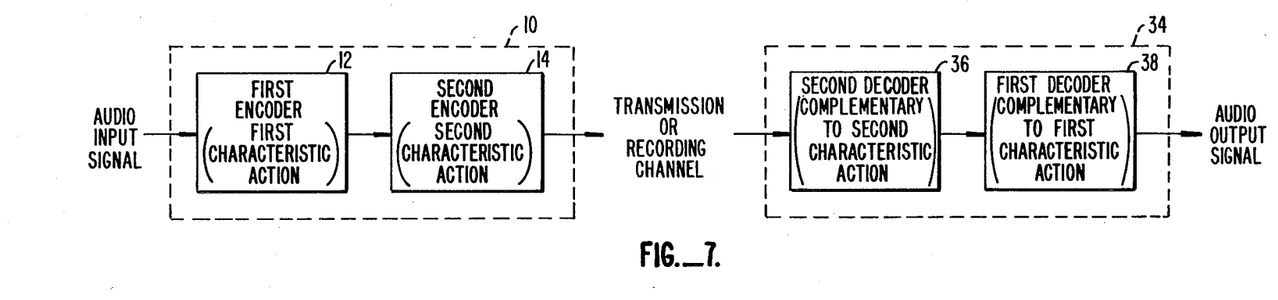
FIG. 7 is a functional block diagram of a complementary system that includes the hybrid encoder according to the embodiment of FIG. 1.

FIG. 7 is a functional block diagram of a complementary system that includes the hybrid encoder according to the embodiment of FIG. 1. Complementary decoding is provided by a hybrid decoder 34 in which a second decoder 36, having a characteristic action complementary to that of the second encoder 14, receives the hybrid decoder 34 input from the transmission or recording channel. The output of decoder 36 is applied to a first decoder 38, having a characteristic action complementary to that of the first encoder 38. The audio output signal, essentially identical to the audio input signal to the hybrid decoder 10, is provided by decoder 38.

Figure 8:
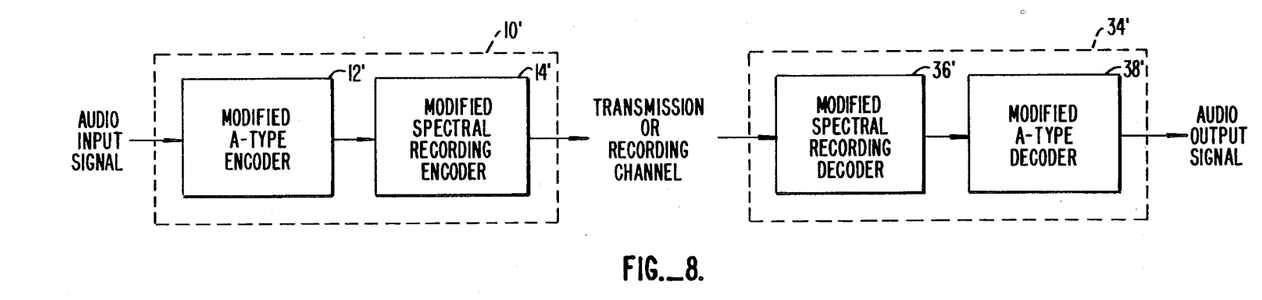
FIG. 8 is a functional block diagram of a complementary system that includes the series hybrid encoder according to the embodiment of FIG. 2.

FIG. 8 is a functional block diagram of a complementary system that includes the hybrid encoder according to the embodiment of FIG. 2. Complementary decoding is provided by a hybrid decoder 34' in which a modified spectral recording decoder 36', having a characteristic action complementary to that of the modified spectral recording encoder 14', receives the hybrid decoder 34' input from the transmission or recording channel. The output of decoder 36 is applied to a modified A-type decoder 38, having a characteristic action complementary to that of the modified A-type encoder 38. The audio output signal, essentially identical to the audio input signal to the hybrid decoder 10', is provided by decoder 38'.

Figure 9:
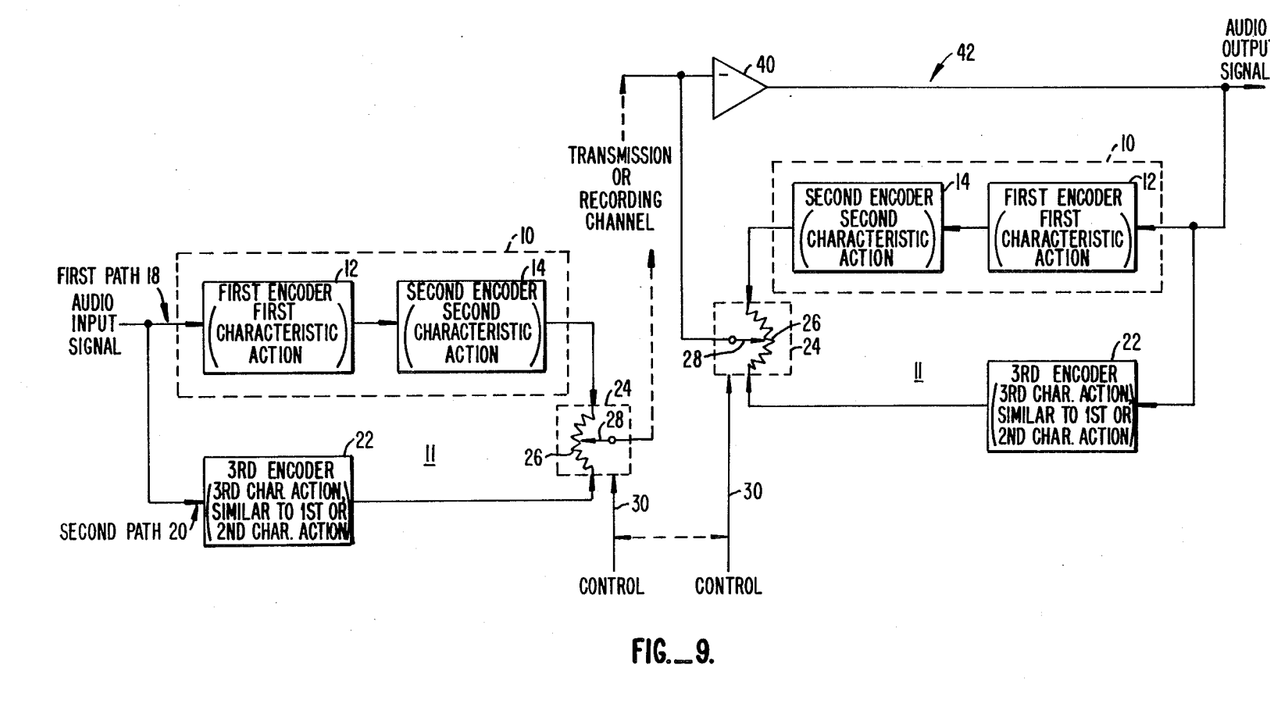
FIG. 9 is a functional block diagram of a complementary system that includes the variable encoder according to the embodiment of FIG. 3.

FIG. 9 is a functional block diagram of a complementary system that includes the variable encoder 11 according to the embodiment of FIG. 3. Complementary decoding is provided by placing the encoder 11 of the embodiment of FIG. 3 in the negative feedback loop of a high gain amplifier 40 to provide a decoder 42. It is well known to provide a complementary decoder by placing an encoder in the negative feedback loop of a high gain amplifier. Because the variable combiner 24 can assume various conditions, some means to link the control lines 30 between the encoder and decoder portions of the companding system must be provided, as indicated by the dashed line between the two control lines. One possible way to do so is to record or transmit a control track signal conveying information as to the control 30 along with the encoded signal. The audio output signal, essentially identical to the audio input signal to the variable encoder 11, is thereby provided by decoder 42.

Figure 10:
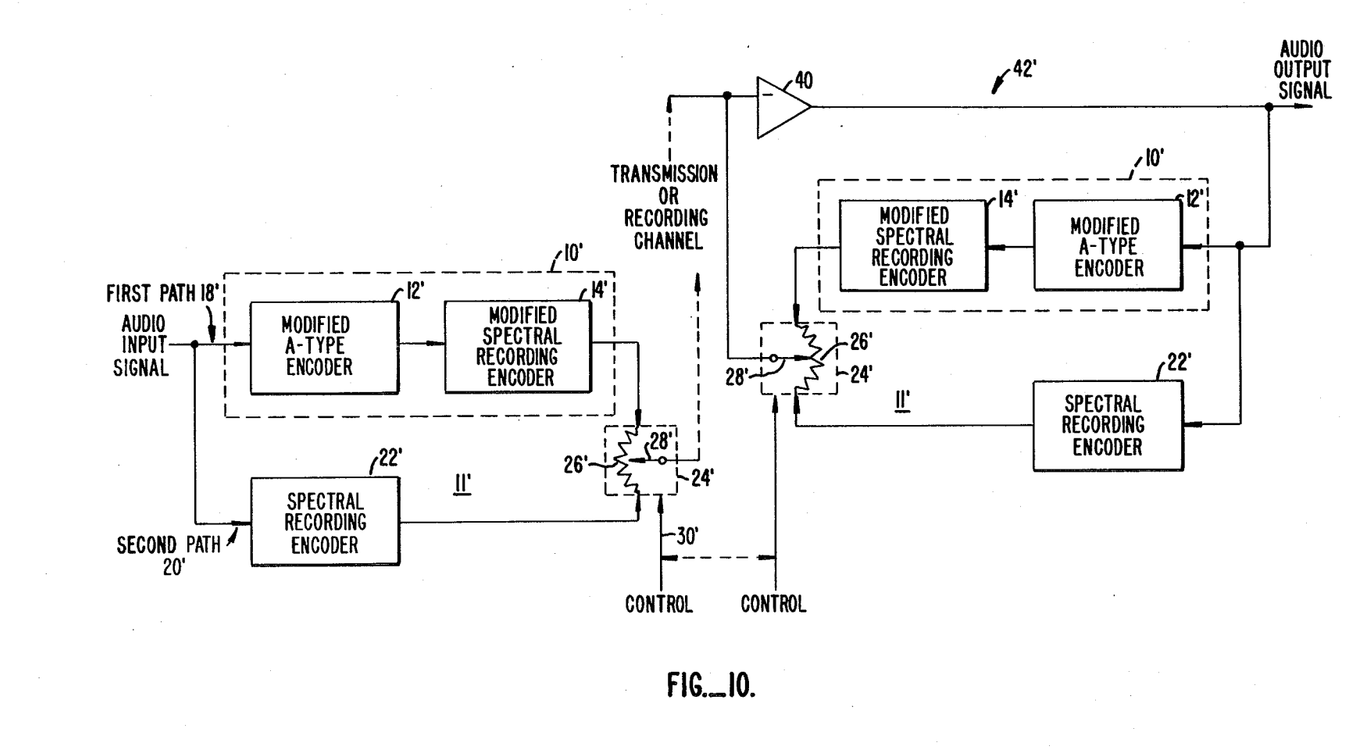
FIG. 10 is a functional block diagram of a complementary system that includes the variable hybrid encoder according to the embodiment of FIG. 4.

FIG. 10 is a functional block diagram of a complementary system that includes the variable encoder 11' according to the embodiment of FIG. 4. Complementary decoding is provided by placing the encoder 11' of the embodiment of FIG. 4 in the negative feedback loop of a high gain amplifier 40. As in the embodiment of FIG. 9, some means must be provided to link the control lines 30 so that the decoder properly tracks the encoder. The audio output signal, essentially identical to the audio input signal to the variable encoder 11', is thereby provided by decoder 42'.

Figure 11:
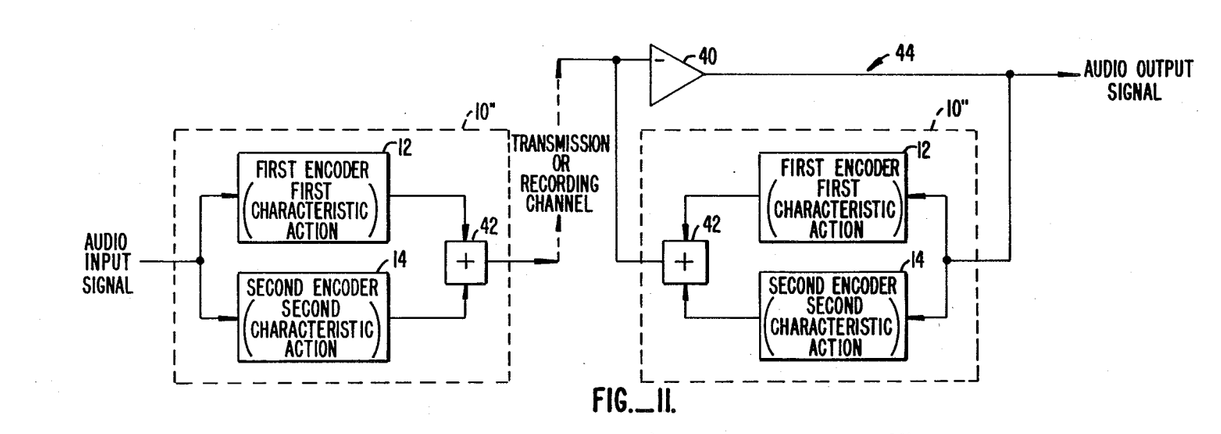
FIG. 11 is a functional block diagram of a complementary system that includes the parallel hybrid encoder according to the embodiment of FIG. 5.

FIG. 11 is a functional block diagram of a complementary system that includes the parallel arrangement of encoders according to the embodiment of FIG. 5. Complementary decoding by a decoder 44 is provided by placing the encoder 10″ of the embodiment of FIG. 5 in the negative feedback loop of a high gain amplifier 40.

Figure 12:
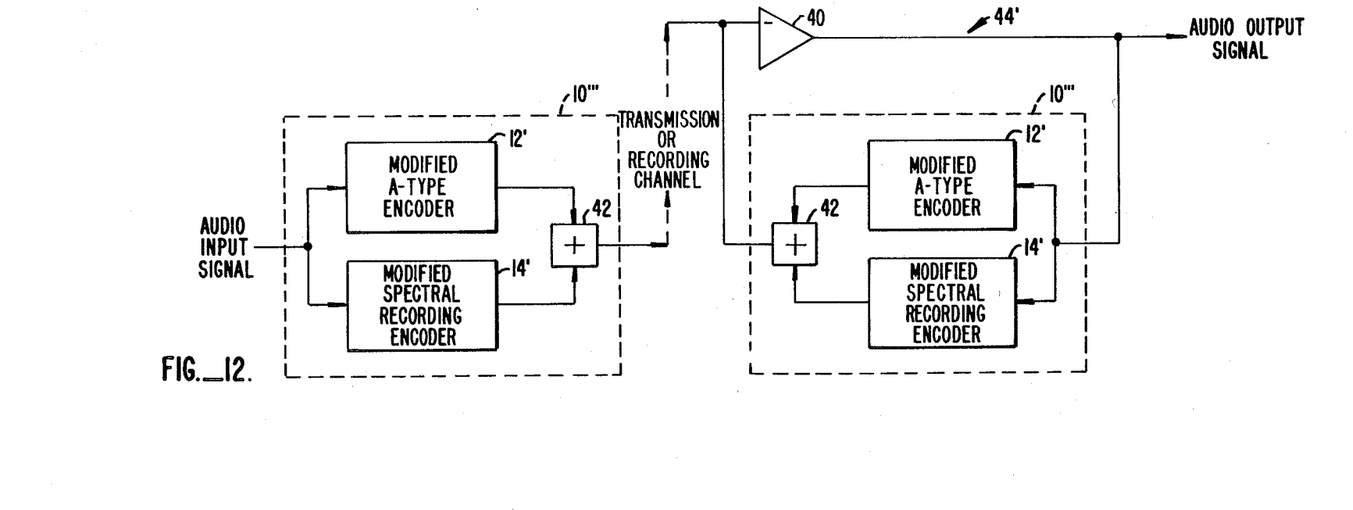
FIG. 12 is a functional block diagram of a complementary system that includes the parallel hybrid encoder according to the embodiment of FIG. 6.

FIG. 12 is a functional block diagram of a complementary system that includes the parallel arrangement of encoders according to the embodiment of FIG. 6. Complementary decoding by a decoder 44′ is provided by placing the encoder 10‴ of the embodiment of FIG. 6 in the negative feedback loop of a high gain amplifier 40.

Complementary systems including the alternative embodiments of the variable encoder in which the hybrid encoder portions have parallel encoders instead of series encoders is achieved by substituting the parallel hybrid encoders 10‴ of FIG. 5 and 10‴ of FIG. 6 for the series hybrid encoders 10 of FIG. 9 and 10′ of FIG. 10, respectively.

We claim:

1. A hybrid encoder having a characteristic action suitable for substantially full complementary playback in an audio signal transmission or recording system using decoders designed for one type complementary encode/decode system while permitting compatible decoding with decoders designed for use with another type complementary encode/decode system, or playback without any special decoders at all, comprising first encoder means having a first encoding characteristic action, which characteristic action is a modification of the encoding characteristic of said one type complementary encode/decode system, second encoder means having a second encoding characteristic action, which characteristic action is a modification of the encoding characteristic of said other type complementary encode/decode system, means for coupling said first and second encoder means to provide hybrid encoder means having a hybrid encoding characteristic action combining aspects of said two encoding characteristic actions, and means for applying audio signals processed by said hybrid encoder means to a signal transmission or recording medium which feeds a playback arrangement that includes a decoder of said one type or said other type complementary encode/decode system or no complementary encode/decode system decoder.

2. The hybrid encoder of claim 1 wherein said means for coupling couples said first and second encoder means in series.

3. The hybrid encoder of claim 1 wherein said means for coupling couples said first and second encoder means in parallel.

4. The hybrid encoder of claim 1 further comprising means for controlling said first and second encoder means for varying said first and second encoding characteristic actions, respectively.

5. The hybrid encoder of claims 1, 2, 3, or 4 wherein the first encoding characteristic action of said first encoder means is a modification of an A-type characteristic action and wherein the second encoding characteristic action of said second encoder means is a modification of a spectral recording characteristic action.

6. A variable encoder having a characteristic action suitable for substantially full complementary playback in an audio signal transmission or recording system using decoders designed for one type complementary encode/decode system while permitting compatible decoding with decoders designed for use with another type complementary encode/decode system, or playback without any special decoders at all, first circuit means including first encoder means having a first encoding characteristic action, which characteristic action is a modification of the encoding characteristic of said one type complementary encode/decode system, second encoder means having a second encoding characteristic action, which characteristic action is a modification of the encoding characteristic of said other type complementary encode/decode system, means for coupling said first and second audio processing encoder means to provide hybrid encoder means having a hybrid encoding characteristic action combining aspects of said two encoding characteristic actions, second circuit means including third encoder means having an encoding characteristic action of said one type complementary encode/decode system, and means for variably selecting audio signals processed by said first circuit means and said second circuit means and applying said audio signals to a signal transmission or recording medium which feeds a playback arrangement that includes a decoder of said one type or said other type complementary encode/decode system or no complementary encode/decode system decoder.

7. The variable encoder of claim 6 wherein said means for coupling couples said first and second encoder means in series.

8. The variable encoder of claim 6 wherein said means for coupling couples said first and second encoder means in parallel.

9. The variable encoder of claims 6, 7, or 8 wherein the first encoding characteristic action of said first encoder means is a modification of an A-type characteristic action, the second encoding characteristic action of said second encoder means is a modification of a spectral recording characteristic action, and the third encoding characteristic action of said third encoder means is a spectral recording characteristic action.

10. A signal transmission or recording system of the complementary encoding/decoding type wherein the system has a hybrid encoder having a characteristic action suitable for substantially full complementary playback in an audio signal transmission or recording system using decoders designed for one type complementary encode/decode system while permitting compatible decoding with decoders designed for use with another type complementary encode/decode system, or playback without any special decoders at all, comprising first encoder means having a first encoding characteristic action, which characteristic action is a modification of the encoding characteristic of said one type complementary encode/decode system, second encoder means having a second encoding characteristic action, which characteristic action is a modification of the encoding characteristic of said other type complementary encode/decode system, means for coupling said first and second encoder means to provide hybrid encoder means having a hybrid encoding characteristic action combining aspects of said two encoding characteristic actions, means for applying audio signals processed by said hybrid encoder means to a signal transmission or recording medium, and playback means for reproducing signals applied to said signal transmission or recording medium, said playback means including a decoder of said one type complementary encode/decode system, said other type complementary encode/decode system, or no complementary encode/decode system decoder.

11. The system of claim 10 wherein said means for coupling couples said first and second encoder means in series.

12. The system of claim 10 wherein said means for coupling couples said first and second encoder means in parallel.

13. The system claims 10, 11, or 12 wherein the first encoding characteristic action of said first encoder means is a modification of an A-type characteristic action and wherein the second encoding characteristic action of said second encoder means is a modification of a spectral recording characteristic action.

14. A signal transmission or recording system of the complementary encoding/decoding type wherein the system has a hybrid encoder having a characteristic action suitable for substantially full complementary playback in an audio signal transmission or recording system using decoders designed for one type complementary encode/decode system while permitting compatible decoding with decoders designed for use with another type complementary encode/decode system, or playback without any special decoders at all, comprising an encoder including first and second circuit means, said first circuit means including first encoder means having a first encoding characteristic action, which characteristic action is a modification of the encoding characteristic of said one type complementary encode/decode system, second encoder means having a second encoding characteristic action, which characteristic action is a modification of the encoding characteristic of said other type complementary encode/decode system, means for coupling said first and second audio processing encoder means to provide hybrid encoder means having a hybrid encoding characteristic action combining aspects of said two encoding characteristic actions, said second circuit means including third encoder means having an encoding characteristic action of said one type complementary encode/decode system, and means for variably selecting audio signals processed by said first circuit means and said second circuit means and applying said audio signals to a signal transmission or recording medium, and playback means for reproducing signals applied to said signal transmission or recording medium, said playback means including a decoder of said one type or said other type complementary encode/decode system or no complementary encode/decode system decoder.

15. The system of claim 14 wherein said means for coupling couples said first and second encoder means in series.

16. The system of claim 14 wherein said means for coupling couples said first and second encoder means in parallel.

17. The system of claims 14, 15, or 16 wherein the first encoding characteristic action of said first encoder means is a modification of an A-type characteristic action, the second encoding characteristic action of said second encoder means is a modification of a spectral recording characteristic action, and the third encoding characteristic action of said third encoder means is a spectral recording characteristic action.

18. A signal transmission or recording system of the complementary encoding/decoding type wherein the system has a hybrid encoder having a characteristic action suitable for substantially full complementary playback in an audio signal transmission or recording system using decoders designed for one type complementary encode/decode system while permitting compatible decoding with decoders designed for use with another type complementary encode/decode system, or playback without any special decoders at all, comprising hybrid encoder means including first encoder means having a first encoding characteristic action, which characteristic action is a modification of the encoding characteristic of said one type complementary encode/decode system, second encoder means having a second encoding characteristic action, which characteristic action is a modification of the encoding characteristic of said other type complementary encode/decode system, means for coupling said first and second encoder means in series to provide hybrid encoder means having a hybrid encoding characteristic action combining aspects of said two encoding characteristic actions, means for applying audio signals processed by said hybrid encoder means to a signal transmission or recording medium, and complementary hybrid decoder means receiving said processed audio signals from said signal transmission or recording medium.

19. The system of claim 18 wherein said complementary hybrid decoder means includes:

second decoder means having a second decoding characteristic action, complementary to said second encoding characteristic action, first decoder means having a first decoding characteristic action, complementary to said first encoding characteristic action, and means for coupling said second and first decoder means in series to provide hybrid decoder means having a hybrid decoding characteristic action complementary to said hybrid encoding characteristic action.

20. The system of claim 18 wherein said complementary hybrid decoder means includes a high gain amplifier having in its negative feedback path said first encoder means, said second encoder means, and said means for coupling said first and second encoder means in series.

21. The system of claims 18, 19, or 20 wherein the first encoding characteristic action of said first encoder means and the first decoding characteristic action of said first decoder means are a modifications of A-type characteristic actions and wherein the second encoding characteristic action of said second encoder means and the second decoding characteristic action of said second decoder means are modifications of a spectral recording characteristic actions.

22. A signal transmission or recording system of the complementary encoding/decoding type wherein the system has a hybrid encoder having a characteristic action suitable for substantially full complementary playback in an audio signal transmission or recording system using decoders designed for one type complementary encode/decode system while permitting compatible decoding with decoders designed for use with another type complementary encode/decode system, or playback without any special decoders at all, comprising hybrid encoder means including
first encoder means having a first encoding characteristic action, which characteristic action is a modification of the encoding characteristic of said one type complementary encode/decode system,
second encoder means having a second encoding characteristic action, which characteristic action is a modification of the encoding characteristic of said other type complementary encode/decode system,
means for coupling said first and second encoder means in parallel to provide hybrid encoder means having a hybrid encoding characteristic action combining aspects of said two encoding characteristic actions, and
means for applying audio signals processed by said hybrid encoder means to a signal transmission or recording medium, and
complementary hybrid decoder means receiving said processed audio signals from said signal transmission or recording medium, including a high gain amplifier having in its negative feedback path said first encoder means, said second encoder means, and means for coupling said first and second encoder means in parallel to provide said hybrid encoder means.

23. The system claim 22 wherein the first encoding characteristic action of said first encoder means is a modification of an A-type characteristic action and wherein the second encoding characteristic action of said second encoder means is a modification of a spectral recording characteristic action.

24. A signal transmission or recording system of the complementary encoding/decoding type wherein the system has a variable encoder having a characteristic action suitable for substantially full complementary playback in an audio signal transmission or recording system using decoders designed for one type complementary encode/decode system while permitting compatible decoding with decoders designed for use with another type complementary encode/decode system, or playback without any special decoders at all, comprising first circuit means including
first encoder means having a first encoding characteristic action, which characteristic action is a modification of the encoding characteristic of said one type complementary encode/decode system,
second encoder means having a second encoding characteristic action, which characteristic action is a modification of the encoding characteristic of said other type complementary encode/decode system,
means for coupling said first and second audio processing encoder means to provide hybrid encoder means having a hybrid encoding characteristic action combining aspects of said two encoding characteristic actions,
second circuit means including third encoder means having an encoding characteristic action of said one type complementary encode/decode system, and
means for variably selecting audio signals processed by said first circuit means and said second circuit means and applying said audio signals to a signal transmission or recording medium, and
complementary variable decoder means receiving said processed audio signals from said signal transmission or recording medium, including a high gain amplifier having in its negative feedback path said first circuit means, said second circuit means, and means for variably selecting audio signals processed by said first circuit means and said second circuit means.

25. The hybrid encoder of claim 24 wherein said means for coupling couples said first and second audio processing encoder means in series.

26. The hybrid encoder of claim 24 wherein said means for coupling couples said first and second audio processing encoder means in parallel.

27. The hybrid encoder of claims 24, 25, or 26 wherein the first encoding characteristic action of said first encoder means is a modification of an A-type characteristic action, the second encoding characteristic action of said second encoder means is a modification of a spectral recording characteristic action, and the third encoding characteristic action of said third encoder means is a spectral recording characteristic action.

* * * * *

UNITED STATES PATENT AND TRADEMARK OFFICE
CERTIFICATE OF CORRECTION

PATENT NO. : 4,815,068

DATED : March 21, 1989

INVENTOR(S) : Ray M. Dolby, Ioan R. Allen, and Randolph G. Pauker

It is certified that error appears in the above-identified patent and that said Letters Patent is hereby corrected as shown below:

Column 2:
  Line 5: "encoded" should be-encoder--

Column 5:
  Line 25: "ad" should be --and--

Column 11:
  Line 13: "db" should be --dB--
  Line 31: "db" should be --dB--

Column 17:
  Line 17: "10'''" after word "encoders" should be --10''--

Column 21:
  Line 2: delete "a" before word "modifications"
  Line 6: delete "a" before word "spectral"

On the title page, item [57] ABSTRACT
  Line 17: delete one of the "selects"

Signed and Sealed this

Twenty-sixth Day of December, 1989

*Attest:*

JEFFREY M. SAMUELS

*Attesting Officer*    *Acting Commissioner of Patents and Trademarks*